(12) United States Patent
Tsubota et al.

(10) Patent No.: US 10,859,327 B2
(45) Date of Patent: Dec. 8, 2020

(54) HEAT EXCHANGER AND MANUFACTURING METHOD FOR THE SAME

(71) Applicant: DENSO CORPORATION, Kariya (JP)

(72) Inventors: Syunsuke Tsubota, Kariya (JP); Takeshi Okinotani, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 15/761,154

(22) PCT Filed: Sep. 9, 2016

(86) PCT No.: PCT/JP2016/076613
§ 371 (c)(1),
(2) Date: Mar. 19, 2018

(87) PCT Pub. No.: WO2017/051728
PCT Pub. Date: Mar. 30, 2017

(65) Prior Publication Data
US 2018/0259269 A1    Sep. 13, 2018

(30) Foreign Application Priority Data

Sep. 22, 2015 (JP) .................... 2015-186167

(51) Int. Cl.
*F28F 9/02* (2006.01)
*F28F 9/18* (2006.01)
(Continued)

(52) U.S. Cl.
CPC ............ *F28F 9/0224* (2013.01); *F25B 39/00* (2013.01); *F28D 1/05341* (2013.01);
(Continued)

(58) Field of Classification Search
CPC .......... F28F 9/02; F28F 9/0221; F28F 9/0224; F28F 9/0229; F28F 9/0278
See application file for complete search history.

(56) References Cited

U.S. PATENT DOCUMENTS 5,107,926 A    4/1992 Calleson
5,152,339 A    10/1992 Calleson
(Continued)

FOREIGN PATENT DOCUMENTS

DE    102007016050 A1 *  10/2007  ......... F28D 1/05391
DE    102007016299 A1    12/2007
(Continued)

*Primary Examiner* — Eric S Ruppert
(74) *Attorney, Agent, or Firm* — Harness, Dickey & Pierce, P.L.C.

(57) ABSTRACT

A heat exchanger includes a stacked body that is configured by tubes stacked in a stacking direction and a header tank. The header tank includes a plate header and a tank body. The tubes include longitudinal ends attached to the plate header. The plate header includes a tube insertion hole provided with a stopper. One of the longitudinal ends of the plurality of tubes is inserted into the tube insertion hole. The stopper sets a position of the one of the longitudinal ends in the tube insertion hole. The stopper is provided with the tube insertion hole, and has a width dimension that is smaller than both of a width dimension of the tube insertion hole and a width dimension of the one of the longitudinal ends of the plurality of tubes when viewed in the stacking direction.

9 Claims, 11 Drawing Sheets

(51) Int. Cl.
*F28D 1/053* (2006.01)
*F28F 1/02* (2006.01)
*F25B 39/00* (2006.01)
*F28D 21/00* (2006.01)
*B23K 1/00* (2006.01)

(52) U.S. Cl.
CPC .......... *F28D 1/05383* (2013.01); *F28F 1/022* (2013.01); *F28F 9/0202* (2013.01); *F28F 9/0229* (2013.01); *F28F 9/18* (2013.01); *B23K 1/0012* (2013.01); *F28D 2021/0068* (2013.01); *F28F 2255/16* (2013.01); *F28F 2275/04* (2013.01); *F28F 2275/12* (2013.01)

(56) References Cited

U.S. PATENT DOCUMENTS

| | | | |
|---|---|---|---|
| 5,246,066 A | | 9/1993 | Morgan et al. |
| 7,472,744 B2 | * | 1/2009 | Gorbounov ........... F25B 39/028 |
| | | | 165/178 |
| 7,562,697 B2 | * | 7/2009 | Gorbounov ........... F25B 39/028 |
| | | | 165/174 |
| 2003/0155109 A1 | * | 8/2003 | Kawakubo ............ F28F 9/0224 |
| | | | 165/173 |
| 2006/0151159 A1 | | 7/2006 | Kawakubo et al. |
| 2007/0131392 A1 | * | 6/2007 | Minami ................. F28D 1/0391 |
| | | | 165/110 |
| 2013/0333867 A1 | * | 12/2013 | Moreau .................. B21D 39/02 |
| | | | 165/164 |
| 2015/0075504 A1 | | 3/2015 | Tomita et al. |

FOREIGN PATENT DOCUMENTS

| | | | | |
|---|---|---|---|---|
| EP | 0745823 A1 | | 12/1996 | |
| EP | 3054258 A1 | | 8/2016 | |
| JP | H02109185 U | | 8/1990 | |
| JP | H05099584 A | | 4/1993 | |
| JP | H10232097 A | | 9/1998 | |
| JP | 2001194088 A | | 7/2001 | |
| JP | 2002013896 A | * | 1/2002 | ............. F28F 9/182 |
| JP | 2003314987 A | | 11/2003 | |
| JP | 2003316437 A | | 11/2003 | |
| JP | 2006017442 A | | 1/2006 | |
| JP | 2009008299 A | | 1/2009 | |
| JP | 2009014282 A | | 1/2009 | |
| JP | 2009097731 A | | 5/2009 | |
| JP | 2013024109 A | | 2/2013 | |
| WO | WO-2015/037097 A1 | | 3/2015 | |
| WO | WO-2015063724 A1 | | 5/2015 | |

* cited by examiner

HEAT EXCHANGER AND MANUFACTURING METHOD FOR THE SAME

CROSS REFERENCE TO RELATED APPLICATIONS

This application is a U.S. National Phase Application under 35 U.S.C. 371 of International Application No. PCT/JP2016/076613 filed on Sep. 9, 2016 and published in Japanese as WO 2017/051728 A1 on Mar. 30, 2017. This application is based on and claims the benefit of priority from Japanese Patent Application No. 2015-186167 filed on Sep. 22, 2015. The entire disclosures of all of the above applications are incorporated herein by reference.

TECHNICAL FIELD

The present disclosure relates to a heat exchanger, which is configured by tubes being stacked, and a manufacturing method for the heat exchanger.

BACKGROUND ART

There has been known a heat exchanger including a stacked body that is configured by tubes stacked in a stacking direction, and a header tank extending in a stacking direction of the stacked body and communicating with the inside of each tube by joining an end of the tube in an longitudinal direction of the tube to the header tank (refer to, for example, Patent Literatures 1 and 2).

For example, in the heat exchanger described in Patent Literature 1, the header tank includes three components, that is, a tank configuring an outer shell, a plate having a tube insertion hole into which an end of each tube is inserted and joined, and an intermediate plate defining the position for the leading end of the tube.

Meanwhile, in the heat exchanger described in Patent Literature 2, the header tank includes two components, that is, a tank configuring an outer shell, and a plate having a tube insertion hole into which an end of each tube is inserted and joined. Parts of the tank have recesses for receiving the end of the tube. In the heat exchanger described in Patent Literature 2, the header tank is simplified by defining a position for the leading end of the tube by the recesses formed in the tank.

PRIOR ART LITERATURES

Patent Literature

Patent Literature 1: JP 2003-316437 A
Patent Literature 2: JP 2006-17442 A

SUMMARY OF INVENTION

In a configuration in which recesses are formed in a tank at a position facing the tube as in Patent Literature 2, a recessed portion and a non-recessed portion are different in the internal surface area of a refrigerant circulation portion in the tank. That is, the internal surface area of each recessed portion of the tank is larger than the internal surface area of the non-recessed portion of the tank.

In the header tank having such a configuration, the pressure resistance of a recessed portion is lower than the pressure resistance of a non-recessed portion, making it difficult to sufficiently ensure pressure resistance for the entire header tank.

In a configuration in which a position for the leading end of each tube is defined not by a tank but by an intermediate plate as in Patent Literature 1, pressure resistance of a header plate can be ensured. However, an increase in the number of components cannot be avoided.

It is an object of the present disclosure to provide a heat exchanger that can ensure pressure resistance of the header tank without increasing the number of components, and to provide a manufacturing method for the heat exchanger.

According to an aspect of the present disclosure, a heat exchanger includes tubes through which a heat-exchange target fluid flows.

The heat exchanger includes a stacked body and a header tank. The stacked body is configured by the tubes stacked in a stacking direction. The header tank extends in the stacking direction and therein defines an internal space. The tubes include longitudinal ends in a longitudinal direction, and the longitudinal ends are attached to the header tank, whereby the internal space is in communication with insides of the tubes.

The header tank includes a plate header and a tank body. The longitudinal ends are attached to the plate header. The tank body is coupled with the plate header and defines the internal space between the tank body and the plate header.

The plate header includes a tube insertion hole provided with a stopper. One of the longitudinal ends of the plurality of tubes is inserted into the tube insertion hole. The stopper sets a position of the one of the longitudinal ends in the tube insertion hole.

The stopper is provided with the tube insertion hole on a side adjacent to the tank body, and has a width dimension that is smaller than both of a width dimension of the tube insertion hole on a side opposite to the tank body and a width dimension of the one of the longitudinal ends of the plurality of tubes when viewed in the stacking direction.

According to the above-described configuration, the plate header, to which the longitudinal ends of the tubes are attached, includes the stopper having the width dimension smaller than the width dimension of the one of the longitudinal ends of the tubes. Therefore, the position of the one of the longitudinal ends of the tubes can be set without an intermediate plate.

In addition, according to the present disclosure, the stopper is provided with the plate header, not with the tank body. Therefore, pressure resistance of the tank body can be secured.

Thus, the heat exchanger in which the header tank has a certain pressure resistance can be provided without increasing a quantity of components.

For example, a manufacturing method for a heat exchanger manufactures a heat exchanger including a stacked body and a header tank. The stacked body is configured by tubes stacked in a stacking direction. The header tank therein defines an internal space that is in communication with insides of the tubes.

The manufacturing method includes assembling the stacked body, molding a plate header, molding a tank body, assembling the header tank, and coupling the header tank and the stacked body. The stacked body is assembled by stacking the tube. The plate header includes a tube insertion hole having a stopper. One of longitudinal ends of the tubes is inserted into the insertion hole. The stopper sets a position of the one of the longitudinal ends in the tube insertion hole. The tank body includes a bulge having a U-shape in cross section. The header tank is assembled by coupling the plate header and the tank body. The header tank and the stacked body are coupled with each other while the one of the longitudinal ends of the plurality of tubes is located inside the tube insertion hole after assembling the header tank and assembling the header tank.

The molding the plate header includes a forming the stopper provided with the tube insertion hole on a side of the tube insertion hole adjacent to the tank body. The stopper has a width dimension that is smaller than both of a width dimension of the tube insertion hole on a side opposite to the tank body and a width dimension of the one of the longitudinal ends. In the coupling the header tank and the stacked body, the header tank and the stacked body are coupled with each other while the one of the longitudinal ends of the plurality of tubes abuts on the stopper.

That is, the stopper is provided with the plate header. Thus, the heat exchanger in which the header tank has a certain pressure resistance can be provided without increasing a quantity of components.

DESCRIPTION OF EMBODIMENTS

Embodiments of the present disclosure will be described referring to drawings. In the embodiments, a part that corresponds to or equivalents to a matter described in a preceding embodiment may be assigned with the same reference number, and descriptions of the part may be omitted.

When only a part of a configuration is described in an embodiment, parts described in preceding embodiments may be applied to the other parts of the configuration.

The embodiments can be combined as required, even when the combination is not explicitly disclosed, as long as the combination is not an obstacle.

First Embodiment

The present embodiment will be described with reference to FIGS. 1 to 10. According to the present embodiment, the description is made on an example in which a heat exchanger in the present disclosure is applied in a radiator 1 that causes the refrigerant to dissipate heat by performing heat exchange between the refrigerant and air in a vehicular air-conditioner for air-conditioning the interior of a vehicle.

The radiator 1 configures a refrigeration cycle of vapor compression type, along with a compressor, pressure reducing mechanism, and evaporator, which are not shown. The refrigeration cycle according to the present embodiment includes a supercritical refrigeration cycle in which high-pressure side refrigerant pressure is equal to or higher than critical pressure (i.e., in a supercritical state). In the refrigeration cycle, carbon dioxide, which is natural refrigerant having a small global warming potential, is used as refrigerant configuring a heat-exchange target fluid.

Figure 1:
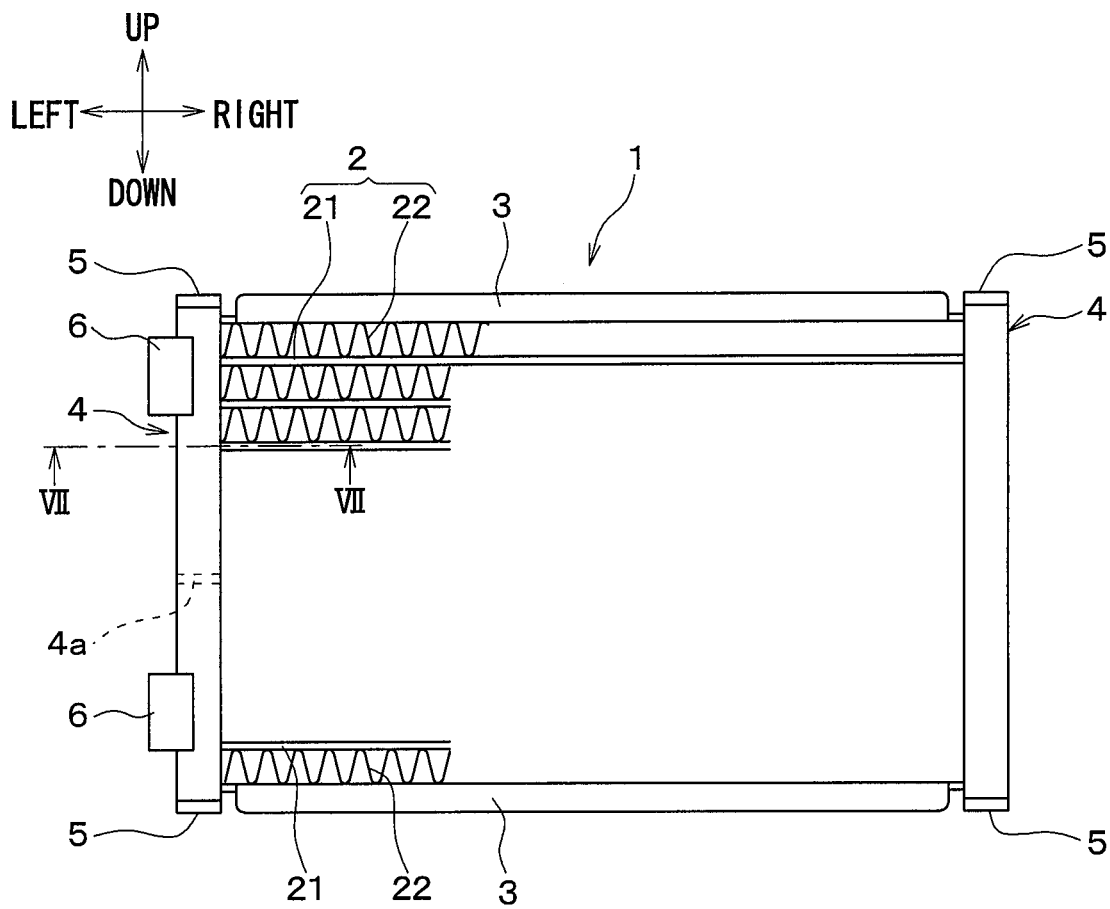
FIG. 1 is a view illustrating the overall configuration of a radiator according to a first embodiment.

As shown in FIG. 1, the radiator 1 according to the present embodiment includes, as main compositional elements, a heat exchanging core 2, a side plate 3, a pair of header tanks 4, a tank cap 5, and a pair of connectors 6. The arrows indicating upward and downward directions and leftward and rightward directions in FIG. 1 indicate directions viewed from the vehicle front, in a state in which the radiator is mounted in the vehicle.

Each member configuring the radiator 1 is formed of a metal material such as aluminum and aluminum alloy. With the members fitted together, the radiator 1 is brazed and joined with a brazing material provided in advance on a required part of each member.

The heat exchanging core 2 configures a heat exchange unit that performs heat exchange between refrigerant in the radiator 1 and air. The heat exchanging core 2 includes tubes 21 in which refrigerant flows, and a fin 22 disposed between adjacent tubes 21 and accelerating heat exchange between refrigerant and air. According to the present embodiment, the heat exchanging core 2 corresponds to a stacked body that is configured by the tubes 21 stacked in a stacking direction.

Figure 2:
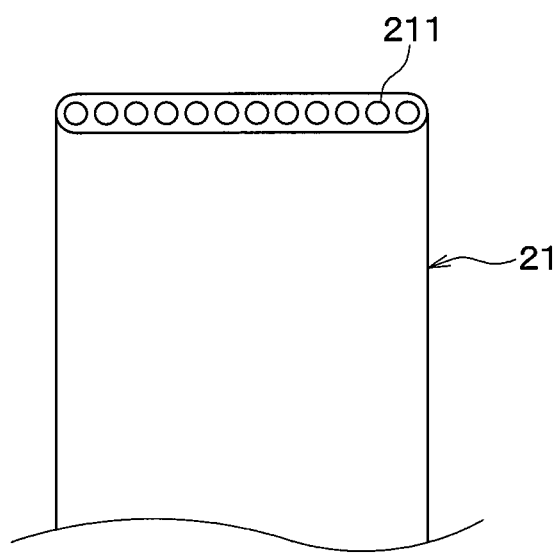
FIG. 2 is a perspective view illustrating a tube of the radiator according to the first embodiment.

Each tube 21 of the present embodiment is configured of a flat tube extending in one direction and has a flat cross-section, as shown in FIG. 2. The tube 21 of the present embodiment has therein a fluid passage 211 having many holes extending in a longitudinal direction of the tube. However, the fluid passage 211 may include a single hole.

The tubes 21 of the present embodiment are arrayed at predetermined intervals such that the flat faces are arranged in parallel. According to the present embodiment, it can be understood that the direction extending along a circulating direction of heat-exchange target fluid in the tube 21 is the longitudinal direction of the tube 21.

As shown in FIG. 1, the side plate 3 is a reinforcement member that reinforces the heat exchanging core 2. The side plate 3 of the present embodiment is disposed at each end of the tubes 21 in the stacking direction in the heat exchanging core 2. According to the present embodiment, the tubes are stacked in an up-down direction. Accordingly, the side plate 3 is disposed at each end of the heat exchanging core 2 in the up-down direction of the heat exchanging core.

Each of the pair of header tanks 4 serves as a tank to which longitudinal ends of the tubes 21 in the longitudinal direction of the tubes 21 are attached. The pair of header tanks 4 collects refrigerant flowing from the tubes 21 and distributes the refrigerant to the tubes 21. Each header tank 4 includes a cylindrical hollow member extending in the stacking direction of the tube 21. The header tank 4 has therein an internal space 40 communicating with the inside of each tube 21.

Figure 3:
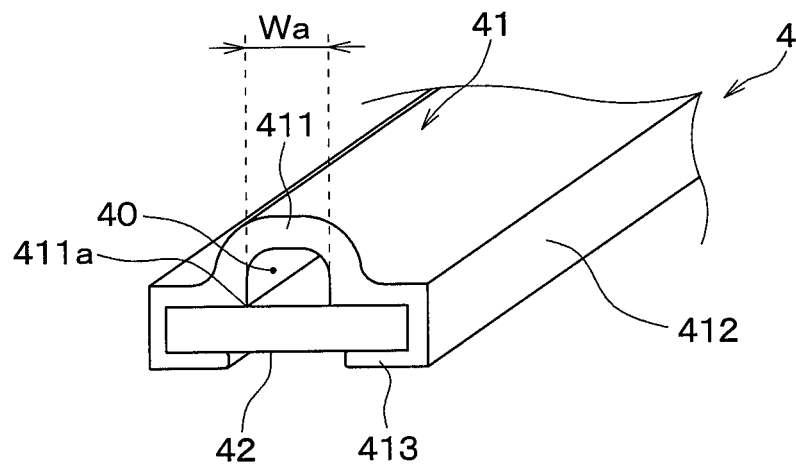
FIG. 3 is a perspective view illustrating a header tank of the radiator according to the first embodiment.

According to the present embodiment, the header tank 4 is a separation-type header tank. The header tank 4 of the present embodiment mainly includes two components, i.e., a tank body 41 and a plate header 42, as shown in FIG. 3.

The tank body 41 is a member configuring an outer shell of the header tank 4. The tank body 41, together with the plate header 42, defines the internal space 40 that is in communication with insides of the tube 21s. The tank body 41 is molded by extruding a metal material such as aluminum.

The tank body 41 of the present embodiment has a bulge 411 and a plate holder 412. The bulge 411 defines the internal space 40 of the header tank 4. The plate holder 412 extends outward from an open end 411a of the bulge 411 and receives the plate header 42.

According to the present embodiment, since the refrigeration cycle is configured by a supercritical refrigeration cycle, a critical state is brought about when carbon dioxide, serving as refrigerant, flows into the radiator 1. A refrigerant pressure in the radiator 1 reaches an extremely high pressure, e.g., 7 MPa or higher. Accordingly, the header tank 4 of the radiator 1 is necessary to have pressure resistance to bear up under high refrigerant pressure.

According to the present embodiment, the header tank 4 includes the bulge 411 such that a center portion of the header tank in a width direction of the tubes 21 has a U-shape in cross section by providing the bulge 411. That is, the bulge 411 has a U-shape in a cross section taken along the longitudinal direction of the tubes 21. As a result, the pressure resistance of the header tank 4 can be improved by suppressing a concentration of a load, which is applied to the header tank 4 due to a pressure of the refrigerant flowing in the internal space 40, to the header tank 4 in a direction in which the tank body 41 and the plate header 42 are separated from each other.

The plate holder 412 temporary fixes the plate header 42 to the tank body 41 while receiving the plate header 42. The plate holder 412 of the present embodiment is bent in a C-shape to fit with the outer periphery of the plate header 42.

Figure 4:
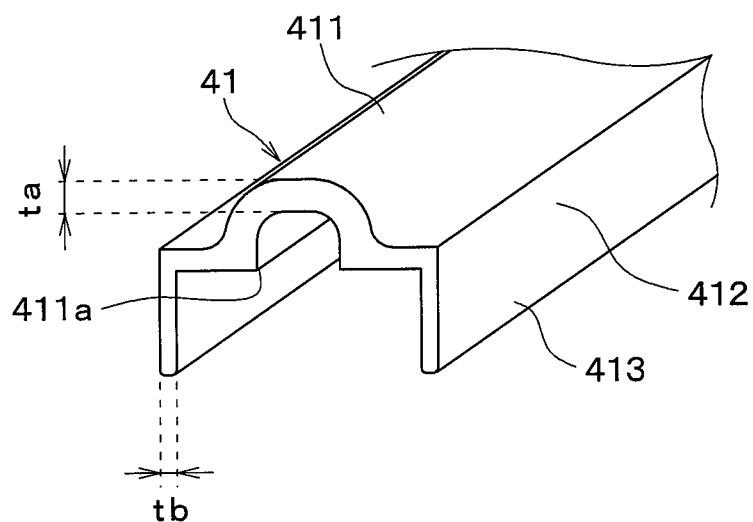
FIG. 4 is a perspective view illustrating a tank body of the radiator according to the first embodiment.

The plate holder 412 is bent and has an L-shape, as shown in FIG. 4, before the plate header 42 is disposed in the tank body 41. According to the present embodiment, the plate header 42 is fixed to the tank body 41 by plastically deforming end portions 413 of the plate holder 412 shown in FIG. 4 inward such that the end portions 413 approach the plate header 42, while the plate header 42 is positioned inside the tank body 41.

The bulge 411 and plate holder 412 are integrally molded by extrusion in order to ensure pressure resistance to bear up under a refrigerant pressure. The tank body 41 is required to have pressure resistance in the bulge 411. On the other hand, the end portions 413 of the plate holder 412 are not required to have the same pressure resistance as the bulge 411.

Therefore, according to the present embodiment, a thickness ta of the bulge 411 is set larger than a thickness tb of each of the end portions 413 (i.e., ta>tb). As a result, a resistance force, which is caused when the end portions 413 of the plate holder 412 is plastically deformed, is reduced while the pressure resistance of the bulge 411 is secured.

The plate header 42 is a member to which longitudinal ends of the tubes 21 in the longitudinal ends are attached. The plate header 42 is formed of a metal plate that is made of aluminum and has an elongated shape. Outer surfaces of the plate header 42 facing each other are clad in a brazing material (not shown).

Figure 5:
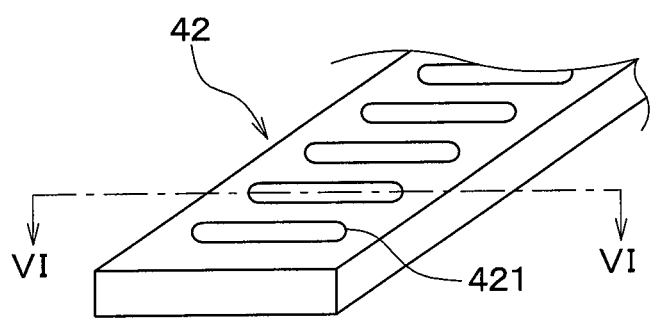
FIG. 5 is a perspective view illustrating a plate header of the radiator according to the first embodiment.

As shown in FIG. 5, the plate header 42 is formed of a plate member and includes slots 421. The slots 421 have a shape that fits with a cross-sectional shape of the tubes 21, e.g., a flat shape. Each of the slots 421 corresponds to a tube insertion hole into which one of the longitudinal ends of the tubes 21 is inserted. A quantity of the slots 421 is equal to a quantity of the tubes 21.

Figure 6:
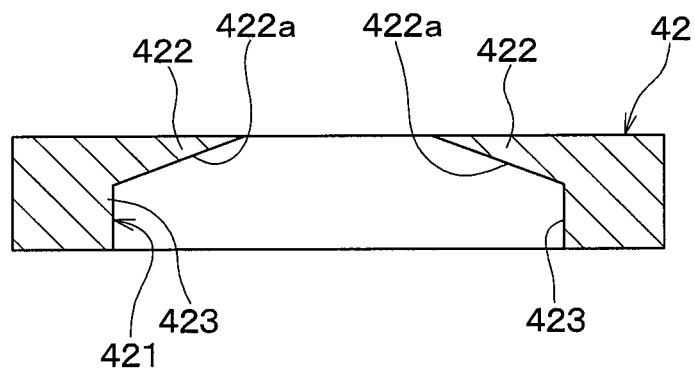
FIG. 6 is a cross-sectional view taken along a line VI-VI in FIG. 5.

Each of the slots 421 is provided with a stopper 422 shown in FIG. 6. The stopper 422 sets a position of the one of the longitudinal ends of the tubes 21 in respective slot 421. Specifically, the stopper 422 is configured by a portion of the plate header 42 that includes an inclined surface 422a connected to an inner wall of the slot 421.

The inclined surface 422a is formed on both sides of the slot 421 in the width direction when viewed in the stacking direction. The inclined surface 422a inclines inward with respect to the inner wall of the slot 421.

The slot 421 includes an abutting portion 423 that abuts on a longitudinal end portion of the tube 21. Specifically, a portion of the slot 421, which faces an outer surface of the longitudinal end portion of the tube 21, includes the abutting portion 423, and the abutting portion 423 abuts on the outer surface of the longitudinal end portion. The abutting portion 423 is a part of the inner wall of the slot 421 and extends in the longitudinal direction.

Figure 7:
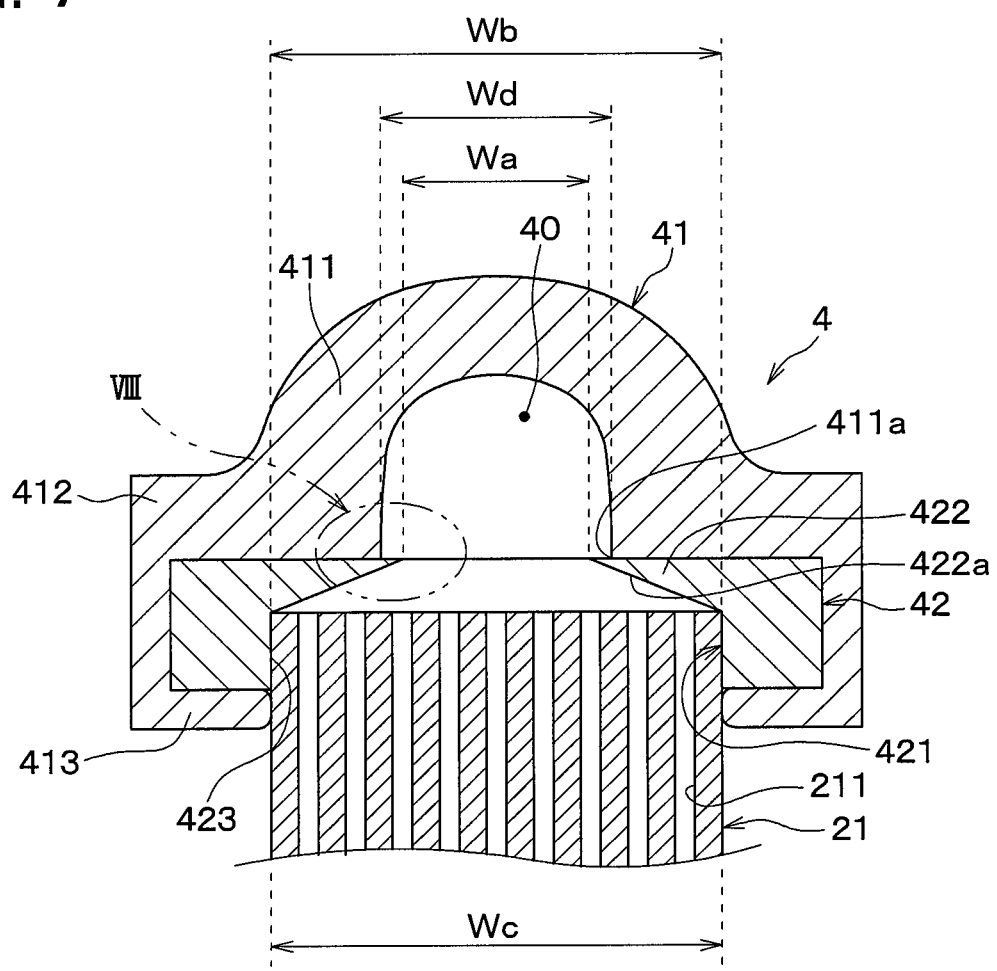
FIG. 7 is a cross-sectional view taken along a line VII-VII in FIG. 1.

FIG. 7 is a cross-sectional view taken along a line VII-VII in FIG. 1. Specifically, FIG. 7 illustrates a cross-section obtained when the header tank 4 to which the end of the tube 21 in the longitudinal direction of the tube is joined is cut in a direction orthogonal to the stacking direction of the tubes 21.

As shown in FIG. 7, according to the present embodiment, the stopper 422 is located adjacent to the tank body 41 in the slot 421. When viewed in the stacking direction, i.e., in a direction perpendicular to a paper showing FIG. 7, the stopper 422 has a width dimension Wa that is smaller than a width dimension Wb of the slot 421 on a side opposite to the tank body 41 and a width dimension Wc of each of the longitudinal ends of the tubes 21.

A dimension Wb of the slot 421, which is connected to the stopper 422 on a side of the stopper 422 opposite to the tank body 41, is set similar to or larger than a dimension Wc of the longitudinal end portion of the tube 21 (Wb≈Wc). As a result, the abutting portion 423 abuts on the outer surface of the longitudinal end portion of the tube 21.

Accordingly, the longitudinal end portion of the tube 21 abuts on the stopper 422 when the longitudinal end portion is inserted into the slot 421, whereby the position of the longitudinal end portion in the slot 421 is set.

In addition, the stopper 422 includes the inclined surface 422a, whereby a rim of the tube 21 is in line-contact with the inclined surface 422a. Accordingly, the stopper 422 does not seal a fluid passage 211 defined in the tube 21. That is, a longitudinal end of the tube 21 in the longitudinal direction defining an end of the fluid passage 211 abuts on the stopper 422, and the tube 21 is coupled with the plate header 42 while the fluid passage 211 is distanced from the stopper 422.

The width dimension of the slot 421 increases as being away from the tank body 41, i.e., increases from a side adjacent to the tank body 41 toward a side opposite to the tank body 41. This configuration is advantageous especially to suppress a stagnation of the refrigerant at the stopper 422 that occurs when the refrigerant flows through the stopper 422.

According to the present embodiment, the tank body 41 includes the bulge 411 that has the U-shape in cross section. That is, a shape of the tank body 41 dramatically changes at the open end 411a of the bulge 411 therefore a stress tends to concentrate to the open end 411a easily.

Figure 8:
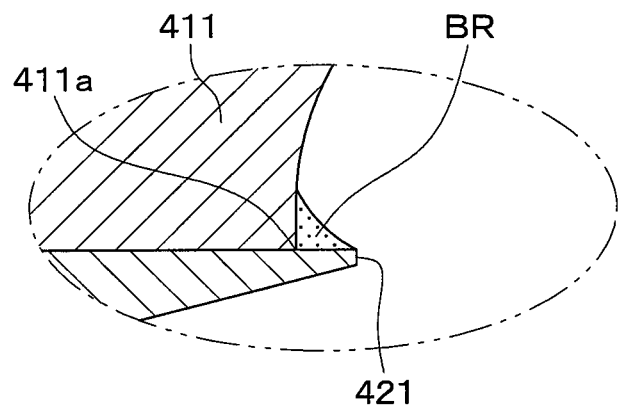
FIG. 8 is an enlarged view illustrating a portion indicated by the symbol VIII in FIG. 7.

Then, the width dimension Wa of the slot 421 in the plate header 42 on the side adjacent to the tank body 41 is set smaller than the width dimension Wd of the open end 411a of the bulge 411. As shown in FIG. 8, the open end 411a of the bulge 411 and a portion of the plate header 42 surrounding the slot 421 are coupled with each other by a brazing material BR.

As shown in FIG. 1, one of the pair of the header tanks 4 therein has a separator 4a. The separator 4a partitions the internal space 40 of the header tank 4 into an upper space and a lower space in the up-down direction. Each of the pair of header tanks 4 includes one end (i.e., an upper end) and an other end (i.e., a lower end) in the stacking direction. Each of the one and the other end is sealed by a tank cap 5.

The internal space 40 of the header tank 4 is in contact with an exterior pipe (not shown), in which the refrigerant flows, by a pair of connectors 6. The pair of connectors 6 is attached to the one of the pair of the header tanks 4 having the separator 4a. One of the connectors 6 configures an inlet connector to guide refrigerant into the header tank 4, and the other connector 6 configures an outlet connector to guide refrigerant from the header tank 4.

Figure 9:
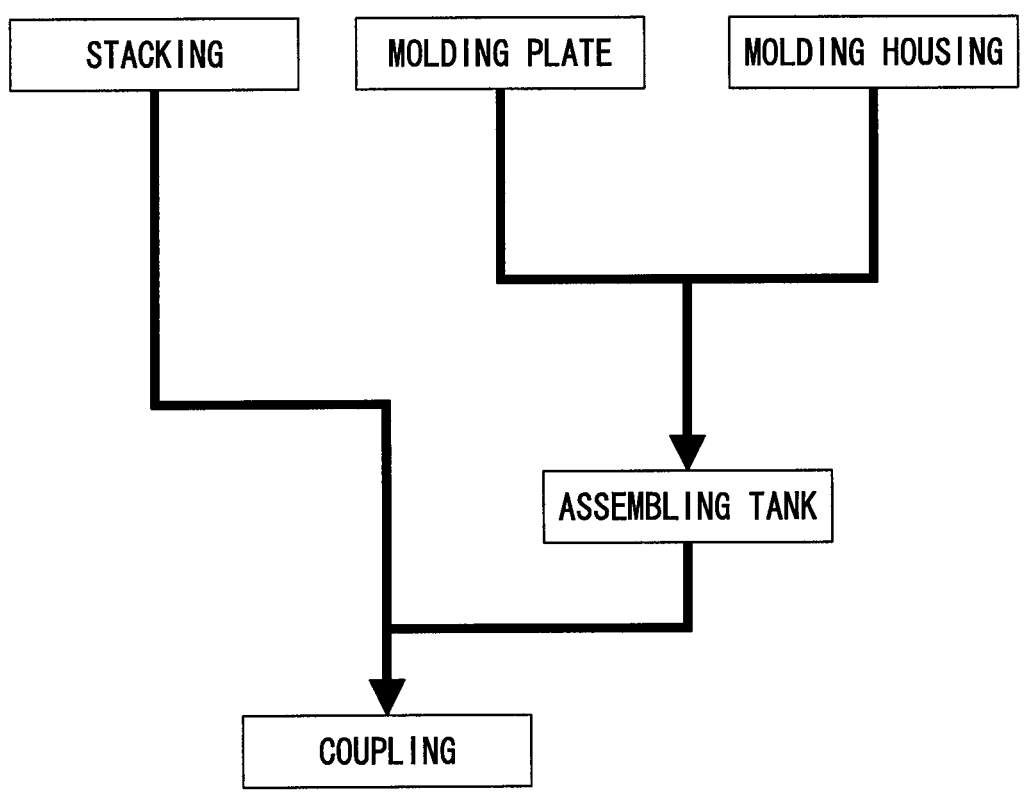
FIG. 9 is a block diagram illustrating a procedure for assembling the radiator according to the first embodiment.

A manufacturing method for the radiator 1 according to the present embodiment will be described referring to FIG. 9 and FIG. 10. FIG. 9 shows the manufacturing method of the radiator 1 schematically. As shown in FIG. 9, the heat exchanging core 2 and the header tanks 4 are formed separately from each other in a first half of the manufacturing method. Therefore, each section of the first half of the manufacturing method will be described separately.

A section for manufacturing the heat exchanging core 2 includes assembling a stacked body that is configured by the tubes 21 stacked in the stacking direction. The assembling the stacked body corresponds to staking the heat exchanging core 2 that includes the stacked body. Specifically, in the stacking, the tubes 21, fins 22, and the side plates 3, which are clad in a brazing material as required, is molded by extrusion to have specified shapes. Subsequently, the tubes 21 and the fins 22 are stacked alternately with each other, and then the side plates 3 are arranged to both end sides of the tubes 21 in the stacking direction respectively. The tubes 21, the fins 22, and the side plates 3 are aligned by a jig such as a wire.

Assembling the header tank 4 includes molding the plate header 42 and molding the tank body 41 (i.e., molding a housing). Subsequently, in assembling the header tank 4, the header tank 4 is formed by assembling the tank body 41 and the plate header 42.

Specifically, the plate header 42, which includes the slots 421 having the stoppers 422, is molded in the molding the plate header 42. In the molding the plate header 42, the plate header 42 is molded in a manner that the slots 421 having the stoppers 422 are formed by a method such as punching in a metal plate. The metal plate is made of a core metal material and has a surface that is clad in a brazing material by rolling.

In the molding the tank body 4, the tank body 41, which includes the bulge 411 having the U-shape in cross section, is molded. Specifically, the tank body 41, which includes the bulge 411 and the plate holder 412 extending from the open end 411a of the bulge 411, is molded by extrusion.

Figure 10:
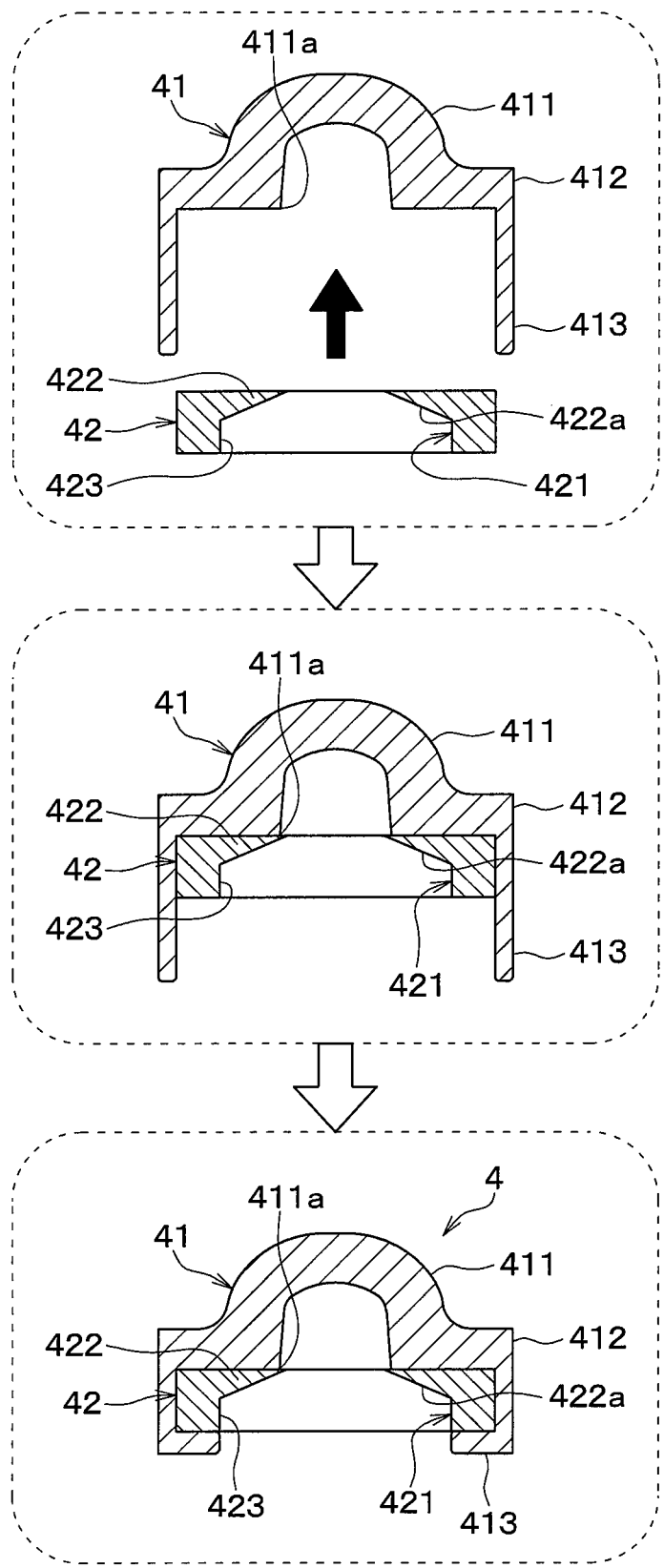
FIG. 10 is a view illustrating a flow of the stepped portions of manufacturing a tank for the radiator according to the first embodiment.

In the assembling the header tank 4, as shown in FIG. 10, the plate header 42 is inserted into the plate holder 412 of the tank body 41. Thus, the plate header 42 is positioned in the plate holder 412 of the tank body 41. In the assembling the header tank 4, the plate header 42 is temporary fixed to the tank body 41 by plastically deforming the end portions 413 of the plate holder 412 inward to approach the plate header 42.

In the assembling the header tank 4, the tank caps 5 are attached to the ends of the header tank 4 in the longitudinal direction (not shown) while the plate header 42 is temporary fixed to the tank body 41. In addition, the pair of connectors 6 is attached to an outer surface of the tank body 41 by a method such as MIG welding.

As shown in FIG. 9, the heat exchanging core 2 and the header tank 4 are coupled with each other while the longitudinal end portions of the tubes 21 are inserted into the slots 421 of the plate header 42, after the stacking and the assembling the header tank 4. That is, the manufacturing method for the radiator 1 includes coupling the heat exchanging core 2, which configures the stacked body, and the header tank 4.

Specifically, in the coupling, the header tank 4 and the heat exchanging core 2 are coupled with each other to form an assembled body while the longitudinal ends of the tubes 21 abut on the stoppers 422 of the slots 421. The assembled body of the header tank 4 and the heat exchanging core 2 are heated in a furnace such that the header tank 4 and the heat exchanging core 2 are coupled by brazing. Subsequently, at last of the coupling, the jig, if used to assemble the header tank 4 and the heat exchanging core 2, is removed.

As described above, the radiator 1 has a configuration that the plate header 42, to which the longitudinal end portions of the tubes 21 are attached, includes the stoppers 422 that have the width dimension smaller than the width dimension of the longitudinal end portions of the tubes 21. Accordingly, the positions of the longitudinal end portions of the tubes 21 in the slots 421 can be set without using an intermediate plate, which is disposed between the tank body 41 and the plate header 42.

Furthermore, the stopper 422 is provided with the plate header 42, not with the tank body 41, whereby the pressure resistance of the tank body 41 can be secured.

Therefore, according to the present embodiment, it is possible to provide the radiator 1 that can secure the pressure resistance of the header tanks 4 without increasing the number of components. Thus, the above-described configuration that can secure the pressure resistance of the header tanks 4 is advantageous to a case where carbon dioxide is employed as the heat-exchange target fluid and a pressure of the refrigerant flowing into the radiator 1 becomes high.

According to the present embodiment, the width dimension Wa of the slot 421 in the plate header 42 on the tank body 41 side is made smaller than the width dimension Wd of the open end 411a of the bulge 411. The open end 411a of the bulge 411 and the portion of the plate header 42 surrounding the slots 421 are coupled with each other using the brazing material BR. Therefore, since the open end 411a can be reinforced by a fillet filled with the brazing material BR, sufficient pressure resistance of the tank body 41 can be ensured.

According to the present embodiment, the stopper 422 includes the inclined surface 422a that is connected to the inner wall of the slot 421. Accordingly, the tube 21 and the stopper 422 are in line-contact with each other, whereby a contact area where the tube 21 and the stopper 422 are in contact with each other can be reduced. Therefore, the stopper 422 of the slot 421 can be prevented from sealing a part of the fluid passage 211 defined in the tube 21.

Furthermore, according to the present embodiment, the inner wall of the slot 421 includes the abutting portion 423 that abuts on the outer surface of the longitudinal end portion of the tube 21. Therefore, a contact area where the tube 21 and the slot 421 are in contact with each other can be secured, whereby a clearance between the tube 21 and the slot 421 can be tightly sealed certainly.

According to the present embodiment, the tank body 41 is molded by extrusion. The extrusion hardly causes a trace such as a shear drop, which has an effect on the pressure resistance of the tank body 41, as compared to pressing. Therefore, the pressure resistance of the tank body 41 can be secured easier by molding the tank body 41 by extrusion.

According to the present embodiment, the end portions 413 of the plate holder 412 of the tank body 41 are plastically deformed, thereby fixing the plate header 42 to the tank body 41. Thus, since the plate header 42 can be temporarily fixed to the tank body 41 by a simple process such as bending, manufacturing cost for the radiator 1 can be reduced through, for example, simplifying processing apparatus.

Second Embodiment

Next, a second embodiment will be described with reference to FIGS. 11 to 15. The present embodiment is different from the first embodiment in that a tank body 41A is fixed to a plate header 42A.

Figure 11:
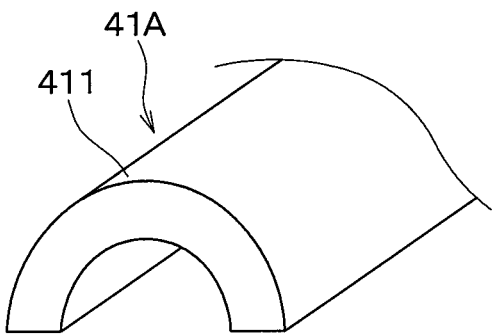
FIG. 11 is a perspective view illustrating a tank body of a radiator according to a second embodiment.

According to the present embodiment, as shown in FIG. 11, the tank body 41A includes the bulge 411 that has the U-shape in cross section. The tank body 41A of the present embodiment is different from the tank body 41 of the first embodiment in a point that the tank body 41A does not include the plate holders 412.

Figure 12:
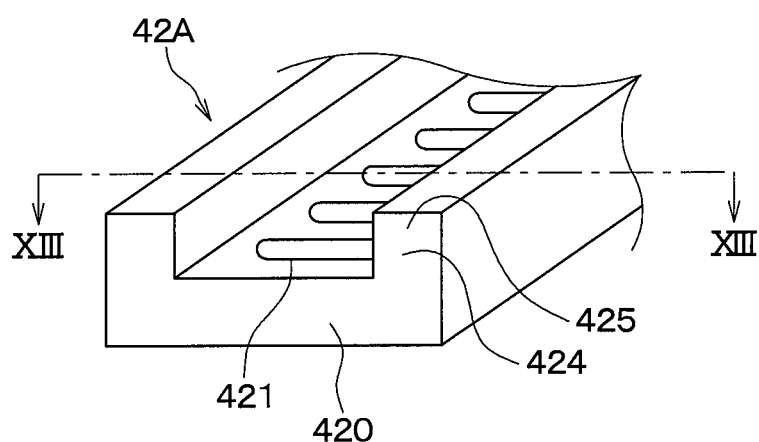
FIG. 12 is a perspective view illustrating a plate header of the radiator according to the second embodiment.
Figure 13:
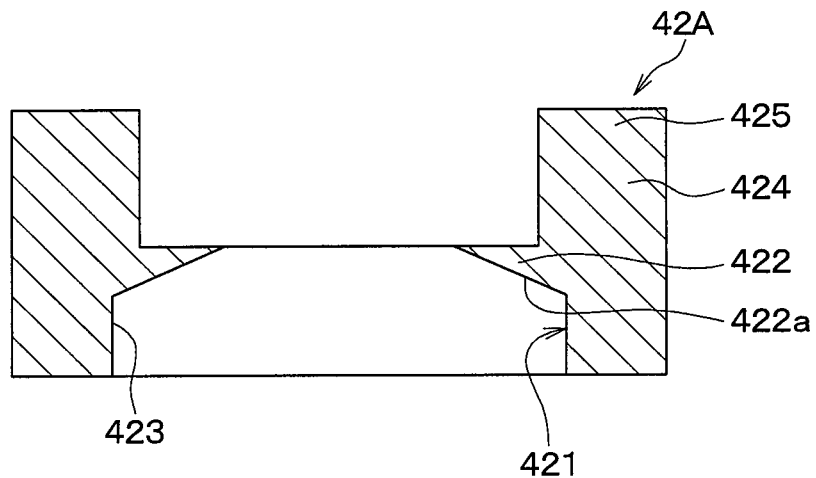
FIG. 13 is a cross-sectional view taken along the line XIII-XIII in FIG. 12.
Figure 14:
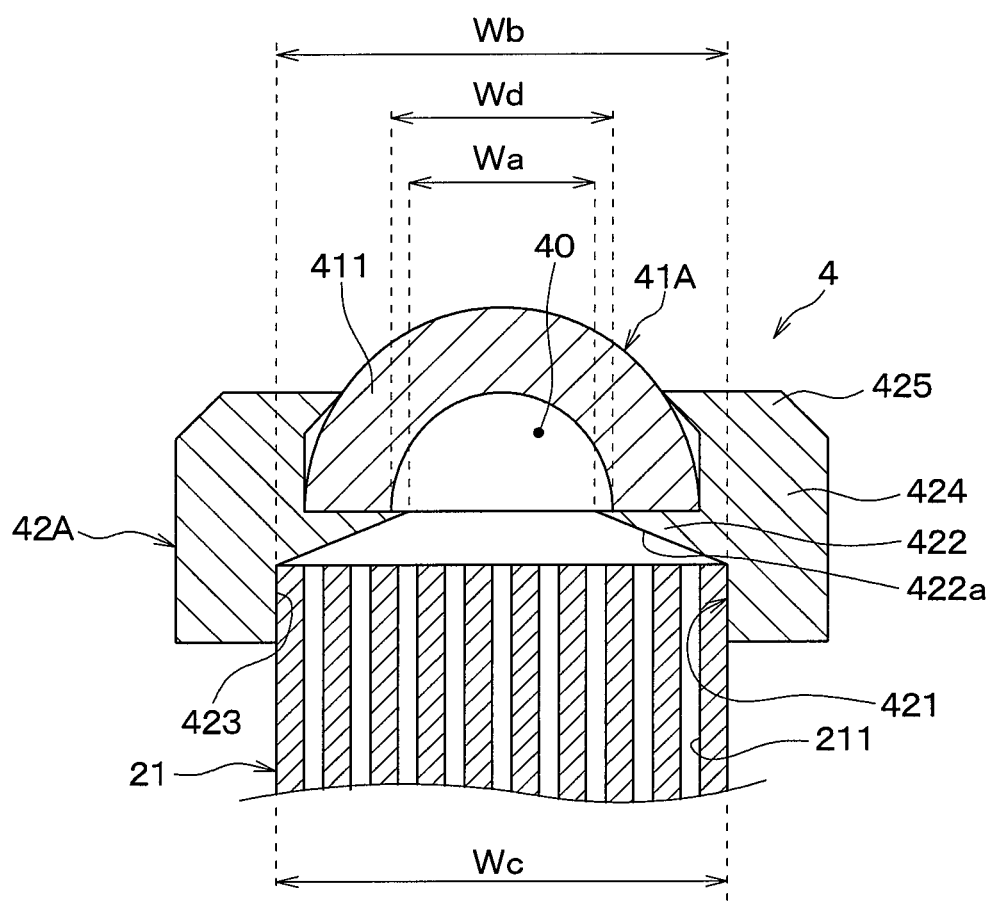
FIG. 14 is a cross-sectional view illustrating a header tank to which a tube of the radiator according to the second embodiment is joined.

As shown in FIG. 12, FIG. 13, and FIG. 14, the plate header 42A includes a plate member 420 and a tank holder 424. The plate member 420 includes slots 421. The tank holder 424 protrudes from each of two end sides of the plate member 420 facing each other in a direction intersecting with a longitudinal direction of the plate member 420. The tank holder 424 holds the tank body 41A.

Each slot 421 of the plate member 420 has the stopper 422 that sets a position of one of the longitudinal ends of the tube 21 inside the slot 421, as shown in FIG. 13 and FIG. 14. Specifically, the stopper 422 of the present embodiment is configured by a portion that includes the inclined surface 422a connected to an inner wall of the slot 421. According to the present embodiment, the plate member 420 corresponds to a hole formation part of the plate header 42A.

As shown in FIG. 14, the stopper 422 of the present embodiment is provided with the slot 421 on a side of the slot 421 adjacent to the tank body 41A. The stopper 422 is configured such that the width dimension Wa of the stopper 422, when viewed in the stacking direction of the tubes 21, is smaller than the width dimension Wb of each slot 421 on a side opposite to the tank body 41A, and smaller than the width dimension We of the end of each tube 21 in the longitudinal direction of the tube.

According to the present embodiment, the width dimension Wa of the slot 421 in the plate header 42A on the side adjacent to the tank body 41A is set smaller than the width dimension Wd of the open end 411a of the bulge 411. According to the present embodiment, the open end 411a of the bulge 411 and a portion of the plate header 42A surrounding the slot 421 are coupled with each other by a brazing material (not shown).

The tank holder 424 temporary fixes the tank body 41A to the plate header 42A while receiving the tank body 41A. The tank holder 424 is bent to have a shape fitting with an outer periphery of the tank body 41A.

The tank holder 424 has a straight shape, as shown in FIG. 13, before the tank body 41A is positioned in the plate header 42A. According to the present embodiment, the tank body 41A is temporary fixed to the plate header 42A by plastically deforming end portions 425 of the tank holder 424 shown in FIG. 13 to approach the tank body 41A while the tank body 41A is coupled with the plate header 42A. The plate member 420 and tank holder 424 according to the present embodiment are integrally molded by extrusion, to ensure strength.

Other configurations in the second embodiment are the same as those in the first embodiment. A manufacturing method for the radiator 1 according to the present embodiment will be described hereafter. In the following description, a portion different from the manufacturing method of the first embodiment will be described, and explanations of corresponding portions are omitted.

The manufacturing method includes assembling the header tank 4. The assembling the header tank 4 includes molding the plate header 42A and molding the tank body 41A (i.e., molding a housing). In the assembling the header tank 4, the header tank 4 is assembled by coupling the tank body 41A and the plate header 42A.

The plate header 42A, which includes the plate member 420 and the tank holder 424, is molded by extrusion in the molding the plate header 42A. The plate member 420 includes the slots 421 having the stoppers 422.

In the molding the tank body 41A, the tank body 41A including the bulge 411 is molded. In the molding the tank body 41A, the tank body 41A is molded to include the bulge 411, which has the U-shape in cross section, for example, by bending a metal plate. The metal plate is made of a core metal material and has a surface that is clad in a brazing material by rolling.

Figure 15:
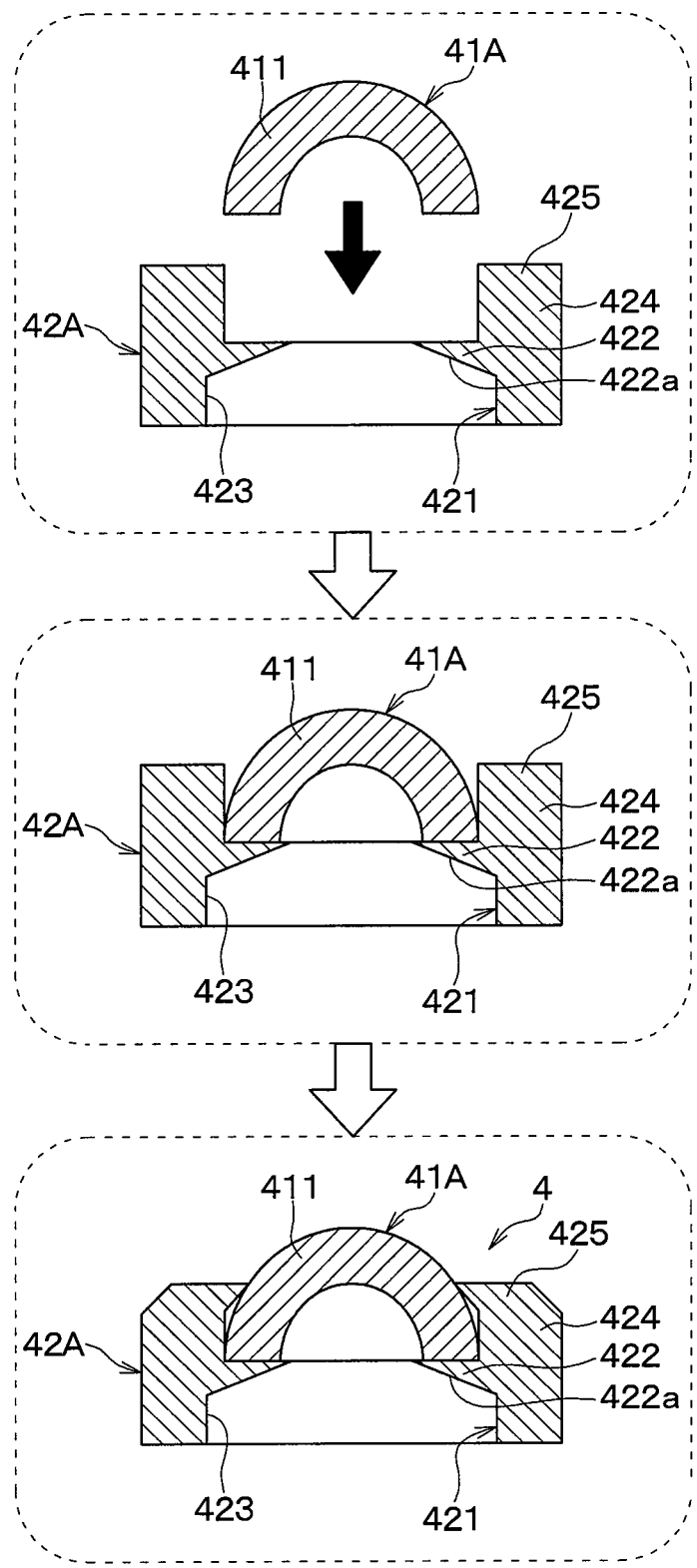
FIG. 15 is a view illustrating a flow of the stepped portions of manufacturing a tank for the radiator according to the second embodiment.

As shown in FIG. 15, in the assembling the header tank 4, the tank body 41A is inserted into the tank holder 424 of the plate header 42A. Thus, the tank body 41A positioned in the tank holder 424 of the plate header 42A. According to the present embodiment, the tank body 41A is temporary fixed to the plate header 42A by plastically deforming the end portions 425 of the tank holder 424 to approach the tank body 41A while the tank body 41A is coupled with the plate header 42A.

As described above, the radiator 1 has a configuration that the plate header 42A, to which the longitudinal end portions of the tubes 21 are attached, includes the stoppers 422 that have the width dimension smaller than the width dimension of the longitudinal end portions of the tubes 21. Therefore, according to the present embodiment, it is possible to provide the radiator 1 that can secure the pressure resistance of the header tanks 4 without increasing the number of components, as in the first embodiment.

According to the present embodiment, the plate header 42A is molded by extrusion, and the end portions 425 of the tank holder 424 of the plate header 42A are plastically deformed, thereby temporarily fixing the tank body 41A to the plate header 42A. In this manufacturing method also, since the tank body 41A can be temporarily fixed to each plate header 42A by a simple process such as bending, manufacturing cost of the radiator 1 can be reduced through, for example, simplifying processing apparatus.

Third Embodiment

Next, a third embodiment will be described with reference to FIG. 16 and FIG. 17. The present embodiment is different from the second embodiment in that the tank body 41A is fixed to the plate header 42A by press-fitting.

Figure 16:
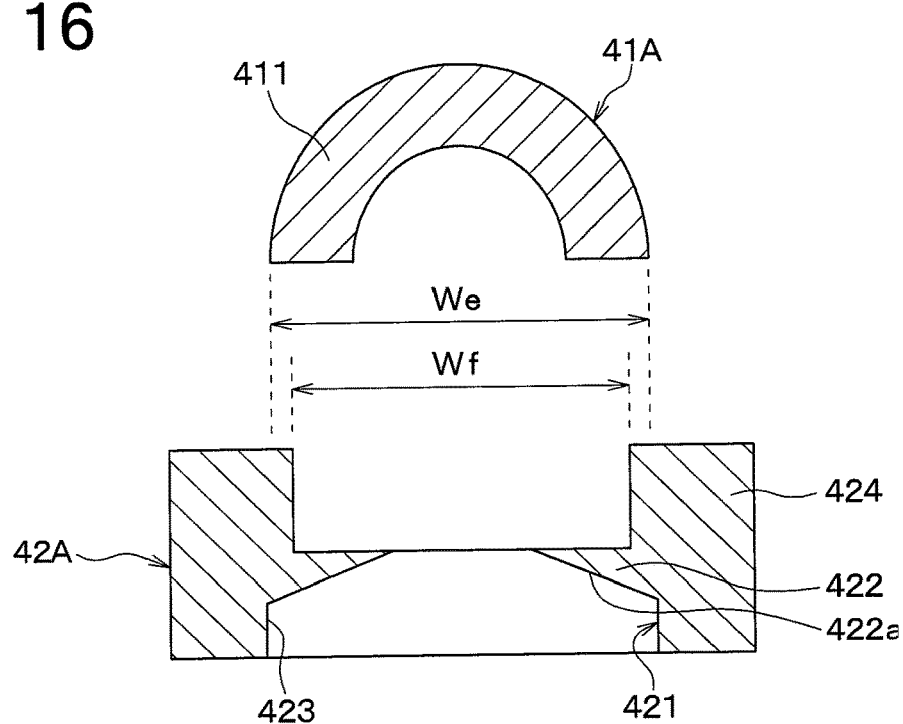
FIG. 16 is a cross-sectional view of a tank body and a plate header of a radiator according to a third embodiment.

As shown in FIG. 16, a width dimension We of the outer shape of the tank body 41A is larger than a width dimension Wf of the tank holder 424 of the plate header 42A.

The other configurations of the third embodiment are the same as those of the second embodiment. A manufacturing method for the radiator 1 according to the present embodiment will be described hereafter. In the following description, a portion different from the manufacturing method of the second embodiment will be described, and explanations of corresponding portions are omitted.

Figure 17:
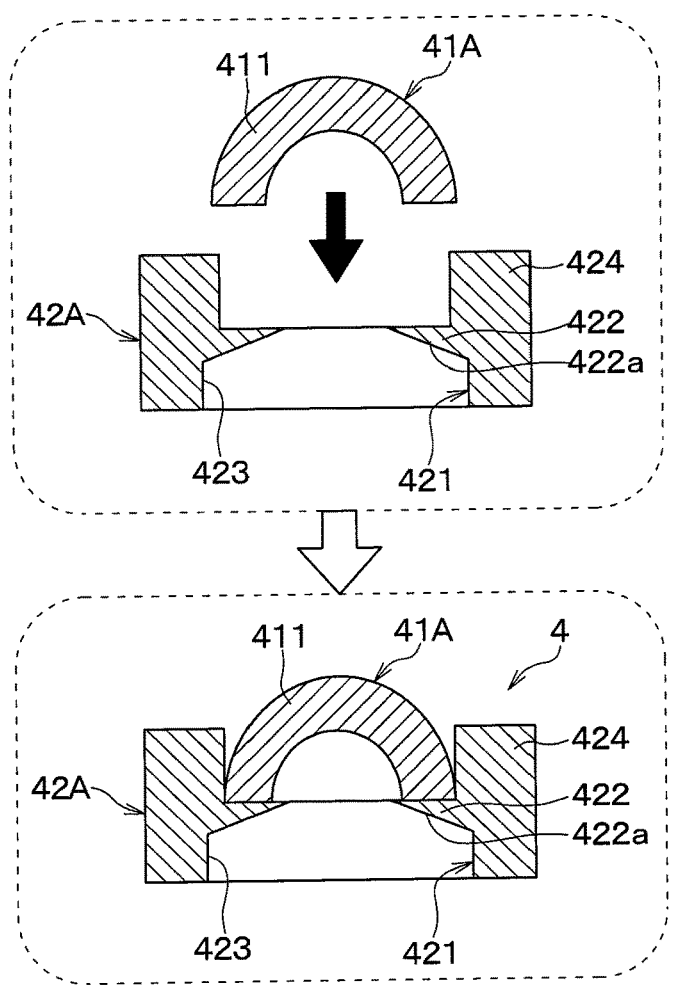
FIG. 17 is a view illustrating a flow of the stepped portions of manufacturing a tank for the radiator according to the third embodiment.

As shown in FIG. 17, the manufacturing method of the present embodiment includes press-fitting the tank body 41A into the tank holder 424 of the plate header 42A. Thus, the tank body 41A is temporary fixed to the plate header 42A.

The radiator 1 of the present embodiment described above has the same configuration as in the second embodiment. Therefore, it is possible to achieve the radiator 1 that can ensure pressure resistance of the header tanks 4 without increasing the number of components, as in the second embodiment.

According to the present embodiment, the plate header 42A is molded by extrusion, and the tank body 41A is temporary fixed to the plate header 42 by press-fitting the tank body 41A into the tank holder 424 of the plate header 42A. According to this manufacturing method, since the tank body 41A can be temporarily fixed to the plate header 42A by a simple process such as press-fitting, manufacturing cost for the radiator 1 can be reduced through, for example, simplifying processing apparatus.

Fourth Embodiment

Next, a fourth embodiment will be described with reference to FIGS. 18 to 20. The present embodiment is different from the first embodiment in a point that the stopper 422 is configured by a portion of the inner wall of the slot 421 which includes a stepped portion 422b.

Figure 18:
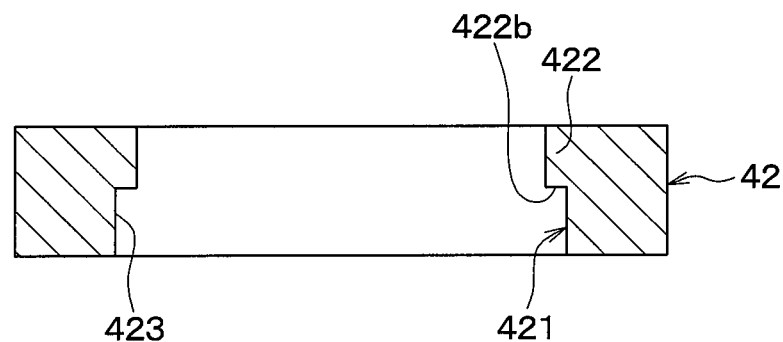
FIG. 18 is a cross-sectional view illustrating a plate header of a radiator according to a fourth embodiment.

As shown in FIG. 18, the inner wall of the slot 421 of the present embodiment is provided with the stepped portion 422b configuring the stopper 422. The stepped portion 422b has a width dimension smaller than a width dimension of the abutting portion 423 in the inner wall of the slot 421, thereby having a stepped portion shape.

Figure 19:
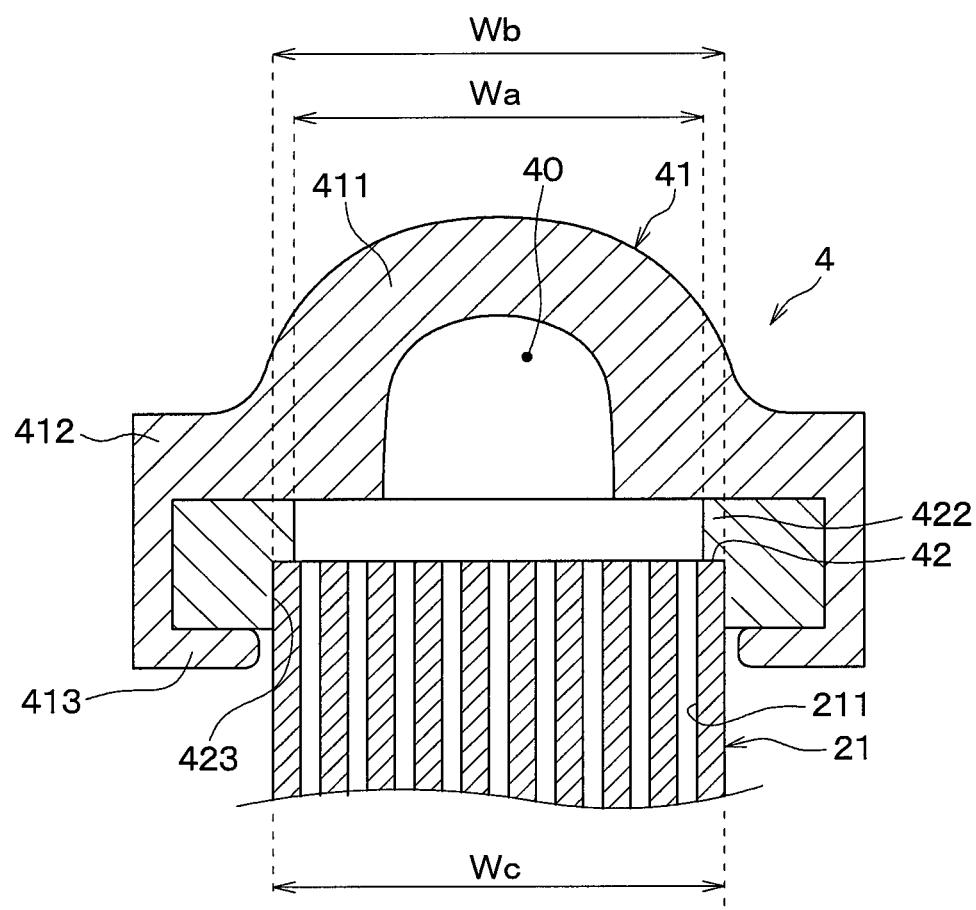
FIG. 19 is a cross-sectional view illustrating a header tank to which a tube of the radiator according to the fourth embodiment is joined.

As shown in FIG. 19, each slot 421 includes the stepped portion 422b on a side adjacent to the tank body 41. When viewed in the stacking direction, i.e., in a direction perpendicular to a paper showing FIG. 19, a width dimension Wa of the stepped portion 422b is smaller than both of the width dimension Wb of the slot 421 and the width dimension We of the longitudinal end portion of the tube 21.

Accordingly, the longitudinal end portions of the tubes 21 abut on the stepped portions 422b of the stoppers 422 when the longitudinal end portions of the tubes 21 are inserted into the slots 421. Therefore, the stepped portions 422b set positions of the longitudinal end portions of the tubes 21 in the slots 421.

The stopper 422 includes the stepped portion 422b, therefore a rim of the tube 21 is in surface contact with the stepped portion 422b. As a result, a part of the fluid passage 211 defined in the tube 21 may be sealed by the stopper 422.

Then, according to the present embodiment, the stepped portion 422b abuts on the rim of the tube 21 defining an opening end of the fluid passage 211 while the stepped portion 422b is distanced from the fluid passage 211. In other words, each tube 21 is attached to the plate header 42 while the rim of the tube 21 defining the opening end of the fluid passage 211 abuts on the stepped portion 422b and the stepped portion 422b is distanced from the fluid passage 211.

Figure 20:
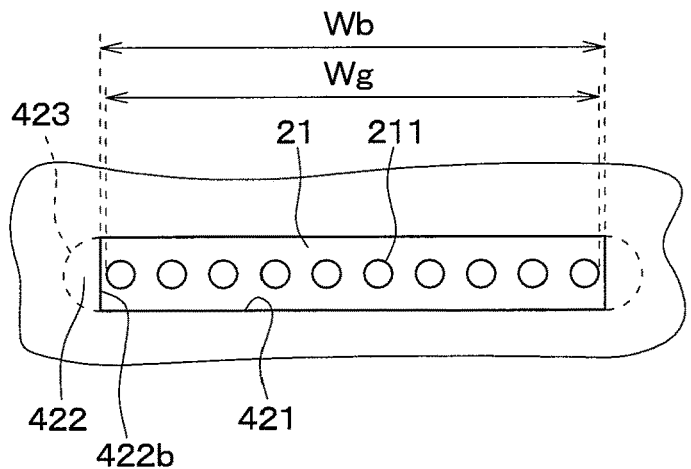
FIG. 20 is a view illustrating the relation between the plate header and the tube when the plate header is viewed from a side adjacent to a tank body.

Specifically, as shown in FIG. 20, the stepped portion 422b has a width dimension Wa that is larger than a distance Wg between an end and an other end of the fluid passage facing each other in the width direction. Thus, the stopper 422 of the slot 421 can be prevented from sealing the fluid passage 211 defined in the tube 21.

The other configurations in the second embodiment are the same as those in the first embodiment. Therefore, according to the configurations of the present embodiment also, it is possible to achieve the radiator 1 that can ensure pressure resistance of the header tanks 4 without increasing the number of components, as in the first embodiment.

According to the present embodiment, the stopper 422 is configured by the stepped portion 422b formed on the inner wall of the slot 421. Therefore, a contact area where the tube 21 and the stopper 422 are in contact with each other can be secured since the tube 21 is in surface contact with the stopper 422, whereby a clearance between the tube 21 and the slot 421 can be tightly sealed certainly.

Fifth Embodiment

Next, a fifth embodiment will be described with reference to FIGS. 21 and 22. The present embodiment is different from the second embodiment in a shape of an end portion 413 of the plate holder 412 of a tank body 41.

Figure 21:
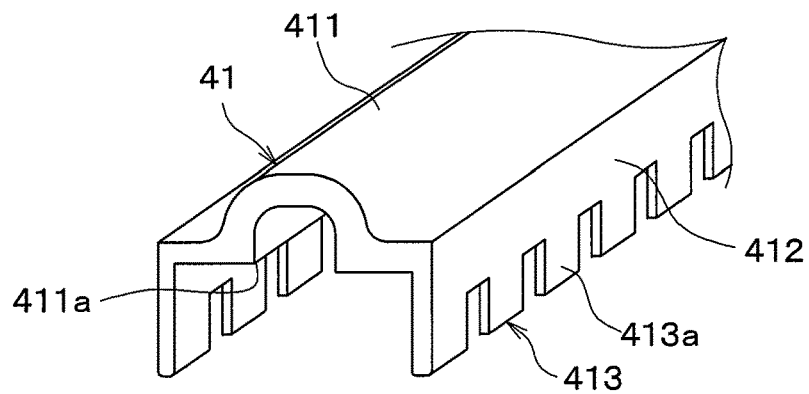
FIG. 21 is a perspective view illustrating a tank body of a radiator according to a fifth embodiment.
Figure 22:
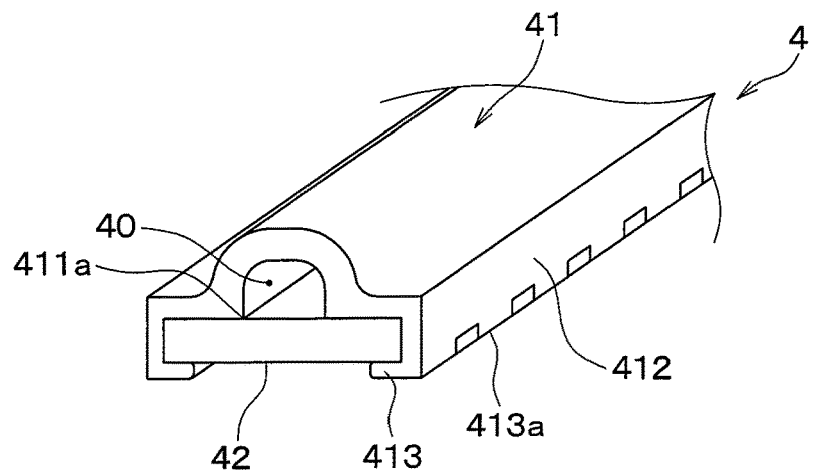
FIG. 22 is a perspective view illustrating a header tank of the radiator according to the fifth embodiment.

As shown in FIGS. 21 and 22, each of the end portions 413 of the plate holder 412 according to the present embodiment includes pawls 413a. Each pawl 413a is a portion that temporarily fixes the tank body 41 to the plate header 42.

According to a manufacturing method according to the present embodiment, the plate header 42 is temporary fixed to the tank body 41 by plastically deforming the pawls 413a inward to approach the pleat header 42 while the plate header 42 is positioned in the plate holder 412.

The other configurations in the fifth embodiment are the same as those in the first embodiment. The radiator 1 according to the present embodiment described above has the same configuration as in the first embodiment. Therefore, it is possible to achieve the radiator 1 that can ensure pressure resistance of header tanks 4 without increasing the number of components, as in the first embodiment.

According to the present embodiment, each of the end portions 413 of the plate holder 412 includes the pawls 413a. Therefore, the pressure resistance of the bulge 411 can be secured, and a resistance force, which is caused when the end portions 413 of the plate holder 412 are plastically deformed, can be reduced.

The present embodiment is an example that the pawls 413a are formed in each of the end portions 413 of the plate holder 412 of the tank body 41, but the present disclosure is not limited to the example. For example, pawls may be formed in the end portions 425 of the tank holder 424 when the plate header 42 includes the tank holder 424 as in the second embodiment. According to this configuration, the pressure resistance of the bulge 411 can be secured, and a resistance force, which is caused when the end portions 413 of the plate holder 412 are plastically deformed, can be reduced also in the second embodiment.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. For example, the present disclosure can be changed variously as follows.

As described in the above-described embodiments, the bulge 411 of the tank body 41 and the tank body 41A has the U-shape in cross section preferably. However the present disclosure is not limited to this example. For example, the bulge 411 may have a V-shape or a W-shape in cross section.

It is preferable that the tank body 41, 41A and the plate header 42, 42A are coupled with each other while the stopper 422 is distanced from the fluid passage 211 as in the above-described embodiment. However, the tank body 41, 41A and the plate header 42, 42A may be coupled with each other while a part of the stopper 422 is in contact with the fluid passage 211.

It is preferable that the width dimension Wa of the slot 421 is smaller than the width dimension of the open end 411a and the open end 411a and the portion of the plate header 42 surrounding the slots 421 are coupled with each other by brazing as the first embodiment. However, the width dimension Wa of the slot 421 may be similar to or larger than the width dimension Wd of the open end 411a and the portion of the plate header 42 surrounding the slots 421 are coupled with each other by brazing.

As in the above-described embodiments, it is preferable that the inner wall of the slot 421 includes the abutting portion 423 that abuts on the outer surface of the longitudinal end portion of the tube 21. However, the abutting portion 423 may be omitted.

The radiator 1 in each embodiment described above is suitable for a heat exchanger using carbon dioxide as the heat-exchange target fluid. However, the present disclosure is not limited by this, and a refrigerant having a small global warming potential such as HFO-1234yf may be used as the heat-exchange target fluid.

In the embodiments described above, the descriptions have been made on an example in which the radiator 1 is applied in a vehicular air conditioner incorporating a supercritical refrigeration cycle. However, the present disclosure is not limited by this. The radiator 1 may also be applied in a heat exchanger for an air conditioner incorporating a normal sub-critical refrigeration cycle, in a heat exchanger used to cool a vehicle engine, and the like. As a matter of course, the heat exchanger in the present disclosure is not limited to vehicular use, but may be used in a heat exchanger for other purposes.

In the embodiments described above, the description has been made on an example in which the heat exchanger is applied in the radiator 1. However, the range of application is not limited to a heat exchanger for heat radiation. The heat exchanger can also be applied for heat absorption as in an evaporator.

The manufacturing procedure for the radiator 1, described in the embodiments above, is an example. The radiator 1 may be manufactured in other manufacturing procedures.

It is to be understood that elements constituting the above-described embodiments are not necessary and may be omitted as required except for a case of being explicitly mentioned to be necessary and a case of being considered to be absolutely necessary in principle.

Even when a factor such as a quantity of elements, a value, an amount, a range is mentioned in the above-described embodiments, it is to be understood that the factor is not limited to a specific value except for a case of being explicitly specified to be necessary or a case of being considered to be absolutely necessary in principle.

Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle.

What is claimed is:

1. A heat exchanger including a plurality of tubes through which a heat-exchange target fluid flows, the heat exchanger comprising:
a stacked body that is configured by the plurality of tubes stacked in a stacking direction; and
a header tank that extends in the stacking direction and therein defines an internal space, the header tank to which longitudinal ends of the plurality of tubes in a longitudinal direction of the plurality of tubes are attached, the internal space being in communication with insides of the plurality of tubes, wherein
the header tank includes
a plate header to which the longitudinal ends of the plurality of tubes are attached, and
a tank body that is coupled with the plate header and defines the internal space between the tank body and the plate header,
the plate header includes a tube insertion hole provided with a stopper, the tube insertion hole into which one of the longitudinal ends of the plurality of tubes is inserted, the stopper setting a position of the one of the longitudinal ends in the tube insertion hole,
the stopper is provided with the tube insertion hole on a side adjacent to the tank body, and has a width dimension that is smaller than both of a width dimension of the tube insertion hole on a side opposite to the tank body and a width dimension of the one of the longitudinal ends of the plurality of tubes when viewed in the stacking direction, the tank body includes a bulge that has a U-shape in cross section, the plate header is configured such that the width dimension of the tube insertion hole on a side adjacent to the tank body is smaller than a width of an open end of the bulge when viewed in the stacking direction, the plate header includes a portion surrounding the tube insertion hole, the portion being brazed with at least the open end of the tank body, the width of the open end of the bulge is smaller than the width dimension of the tube insertion hole on the side opposite to the tank body when viewed in the stacking direction, the portion of the plate header surrounding the tube insertion hole being brazed with at least the open end of the tank body forms a ledge between the open end of the bulge and the plate header, and a brazing material abuts the ledge.

2. The heat exchanger according to claim 1, wherein each of the plurality of tubes therein defines a fluid passage in which the heat-exchange target fluid flows and includes a rim defining an end of the fluid passage, and the plurality of tubes are attached to the plate header while the rim is in contact with the stopper and the fluid passage is distanced from the stopper.

3. The heat exchanger according to claim 1, wherein the stopper is configured by a portion including an inclined surface that is connected to an inner wall of the tube insertion hole.

4. The heat exchanger according to claim 1, wherein the stopper is configured by a portion of an inner wall of the tube insertion hole that includes a stepped portion.

5. The heat exchanger according to claim 1, wherein an inner wall of the tube insertion hole includes an abutting portion that abuts on an outer surface of a longitudinal end portion of one of the plurality of tubes.

6. The heat exchanger according to claim 1, wherein the width dimension of the tube insertion hole increases from a side adjacent to the tank body toward a side opposite to the tank body.

7. The heat exchanger according to claim 1, wherein one of the plate header and the tank body has a holder that is bent along and holds an other one of the plate header and the tank body.

8. The heat exchanger according to claim 1, wherein the tank body has a plate holder that holds the plate header, and the plate holder extends from the open end of the bulge and is bent along an outer peripheral edge of the plate header.

9. The heat exchanger according to claim 8, wherein a thickness of the bulge is larger than a thickness of the plate holder.

* * * * *